(12) United States Patent
Matveyenko et al.

(10) Patent No.: US 7,000,184 B2
(45) Date of Patent: Feb. 14, 2006

(54) REMOTE WEB SITE EDITING IN A STANDARD WEB BROWSER WITHOUT EXTERNAL SOFTWARE

(75) Inventors: Wade A. Matveyenko, Kirkland, WA (US); Bryan Benson, Bow, WA (US); Stella M. Uyeno, Bellefonte, PA (US); Brian T. Worsham, Maple Valley, WA (US); Rajan Krishnamurty, Bellevue, WA (US)

(73) Assignee: The Cobalt Group, Inc., Seattle, WA (US)

( * ) Notice: Subject to any disclaimer, the term of this patent is extended or adjusted under 35 U.S.C. 154(b) by 193 days.

(21) Appl. No.: 10/351,465

(22) Filed: Jan. 24, 2003

(65) Prior Publication Data

US 2004/0148576 A1 Jul. 29, 2004

(51) Int. Cl.
*G06F 17/00* (2006.01)

(52) U.S. Cl. ...................................... 715/530; 715/513

(58) Field of Classification Search ................ 715/513, 715/514, 505, 501, 530; 707/10; 709/217
See application file for complete search history.

(56) References Cited

U.S. PATENT DOCUMENTS

| | | | | |
|---|---|---|---|---|
| 5,845,299 | A * | 12/1998 | Arora et al. ................. | 715/513 |
| 5,911,145 | A * | 6/1999 | Arora et al. ................. | 715/514 |
| 6,026,433 | A * | 2/2000 | D'Arlach et al. ........... | 709/217 |
| 6,151,609 | A * | 11/2000 | Truong ........................ | 715/505 |
| 6,343,302 | B1 * | 1/2002 | Graham ................... | 715/501.1 |
| 6,581,061 | B1 * | 6/2003 | Graham ........................ | 707/10 |

* cited by examiner

Primary Examiner—Sanjiv Shah
(74) Attorney, Agent, or Firm—Stoel Rives LLP

(57) ABSTRACT

A dynamic web-based application for WYSIWYG editing of a web page generates editor functionality embedded into the web page using standard markup language so that a remote user with permission can edit the web page in a standard web browser without installing any external software. The resulting "editable web page" includes at least one editable content cell, such as a text cell or graphic cell, identified by an editing icon and interactive editing behavior.

23 Claims, 13 Drawing Sheets

| Site ID = 2a00b |
|---|
| Version = 0020 [WIP] |
| Cell ID = 00A6 |
| Text = "This is the long-anticipated 6-speed Roadster model" |
| OldText = "This is the Roadster model" |

REMOTE WEB SITE EDITING IN A STANDARD WEB BROWSER WITHOUT EXTERNAL SOFTWARE

COPYRIGHT NOTICE

©2003 the Cobalt Group. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application pertains to the World Wide Web (hereinafter "the Web") and, more specifically, it is directed to methods and systems to enable remote or client-side visual editing of web pages, commonly referred to as "what you see is what you get" or WYSIWYG (pronounced "wiz-ee-wig") editing, within a web browser application without installing any external software.

BACKGROUND OF THE INVENTION

The "Web" is now well developed and literally millions of Web sites have been deployed, hosted on various servers around the world. Web sites comprises one or more related "pages," in some cases extending to scores or even hundreds of pages. The subject matter of web sites spans the full range of human interests and endeavors, and many web pages now include dynamic content as well as multi-media content such as audio and video clips, slideshows and the like.

The creation and maintenance of web sites, especially sophisticated sites, requires appropriate software "tools". In the simplest case, a page designer who is skilled in the use of a known page "markup language" such as HTML can use almost any text editor to create a web page. More specifically, the designer creates an HTML file that defines the desired page layout and content. The page file is stored, often together with other, related page files, in a file system coupled to a web server that is arranged for "hosting" the corresponding site (and potentially other sites as well). When a user "visits" the site, by navigating a web browser to the corresponding address or URL, he can download and view the page (or, the "home page" will simply download automatically when accessed). Typically, the web browser is a program running on the user's computer (or other web-enabled device such as a cell phone). A standard web browser, such as Microsoft's Internet Explorer or Netscape, contains code for interpreting the HTML page and displaying the page. This is a simplified summary as the topic is well known.

Most web sites today are created and maintained using editors better suited to the task than an ordinary text editor or word processor. For example, an HTML editor can specially mark HTML "tags" and enforce compliance with HTML (or other markup language) standards. Some HTML or web page editors will provide several screen displays or "views" for the convenience of the designer, such an a code window showing the HTML code, and a "preview" or browser window showing how the web page will appear when the present code is processed in a web browser. These two views might be available side by side for showing the page designer the effects of various code changes in near-real time. Known web page editors typically also include file "browsing" features for storing and fetching content files for inclusion in a page under construction.

Known web site editors fall into several broad categories. First, there are "full blown" or standalone application programs for building web sites. Popular examples include Macromedia's "Dreamweaver" and Microsoft's "Front Page." Many of these products provide extensive "visual editing," which refers to designing a web page using "point and click" or "drag and drop" interfaces that enable selection of layouts and design styles and elements without writing code. The editor generates the code, such as HTML, that will implement the desired page design. Such programs may include various predetermined design "templates" to give the novice designer a "head start". Standalone web page editors, however, are bulky applications, typically they cost money, and they require installation in a compatible computer to use them. A "compatible" computer here refers to one that runs the operating system on which the editor application was designed to run (and meets other system requirements such as available memory and processor specifications). Standalone editors also require that the user upload or "publish" the completed web page to a server when it is ready for use on the Web (sometimes called "going live").

A second class of web site (or page) editor are those that run in a web browser. These are typically implemented as "plug-ins" i.e., code that is installed to supplement the web browser's native capability. Usually, plug-ins are acquired by download (via the Web) and then installed on the user's machine. One such plug-in editor is called "eWebEdit". Once installed, it can be used to create or edit HTML code in a web browser, and then display the resulting web page. While this approach avoids acquiring and installing a complete, standalone web editor application, it still requires a software download, which can be time consuming if the user has a low-bandwidth connection.

Some web editors are implemented as Java applets that are downloaded to a user's web browser. Like the use of plug-ins, this technique requires downloading software (although "installation" may be transparent), which can cause annoying delay especially where the user has a slow connection. Finally, there are web editors deployed on a server for remote client-server operation. These of course impose a traffic burden on the network and may not be suitable for numerous users.

What is needed is a way to allow remote users to edit a web page (or entire site) maintained on a web server without requiring each user to acquire and install web editing software. Put another way, any web user (with permission) using virtually any computer should be able to edit a web page without having to download or otherwise install special web editing software.

SUMMARY OF THE INVENTION

One aspect of the present invention is directed to an "editable web page". This is typically realized as a computer software file stored on machine-readable media or in a memory. The "editable web page" can be downloaded, for example via the Internet, to a client machine web browser. It differs from ordinary web pages in that the editable web page can indeed be edited in WYSIWYG manner in a standard web browser without the use of external software, such as plug-ins or applets.

In accordance with a presently preferred embodiment, the editable web page file comprises code defining a "web page"

expressed in a predetermined markup language, for example HTML or DHTML. The editable web page file includes, in one illustrative embodiment:

(a) markup language code defining elements of the web page, including a content cell;
(b) markup language code for displaying a visual indication that the content cell is an editable cell; (when the web page is displayed/processed by the web browser);
(c) markup language code for displaying an editing panel in response to user selection of the editable cell for editing;
(d) markup language code for capturing and storing editing actions taken by the user in the editing panel for modifying the editable cell; and
(e) markup language code for submitting the captured editing actions to a web server.

The editable cell may contain any kind of content such as a Flash, audio clip, video clip, pdf, graphic, etc. It may be edited by the user selecting or uploading a replacement for the cell, such as a new jpeg file to replace a picture cell. It may also be edited by the user modifying the existing content, such as editing text.

In accordance with a presently preferred embodiment, the editable cell has dynamic visual properties, such as a boundary box, implemented using a DHTML DIV tag or the like, associated with editing features.

A second aspect of the present invention comprises a dynamic web application computer program designed for execution on a server so as to generate a markup-language page, for example an HTML/DHTML page, that is editable, once downloaded, in a standard web browser. The application that generates an editable page can be conveniently implemented using, for example, Java Server Pages (JSP) or Active Server Page (ASP) technologies.

Another aspect of the present invention pertains to a visual or wysiwyg method of editing a web page in a remote user's client web browser, again without employing any external code on the user's computer. This methodology generally calls for designing and storing a web page on a web server; in the web page, designating at least one editable content cell; responsive to a request from the user's web browser to edit the web page, confirming that the user has permission to edit the web page, and downloading the requested web page to the browser in an editable form.

After editing, results are submitted from the client web browser to the hosting server that include an identifier of the web site, a version of the web site, an identifier of the web page edited, an identifier of the specific cell edited; and indicia of new content for the identified editable cell.

The web server or server application then reads the submission and updates the affected web page so as to incorporate the indicated new content of the identified editable cell. The new content may be submitted by the remote user (web browser) or it may be loaded from a library at the server side. Finally, the updated page is re-rendered on the user's web browser to show her immediately the effect of the edit submitted.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
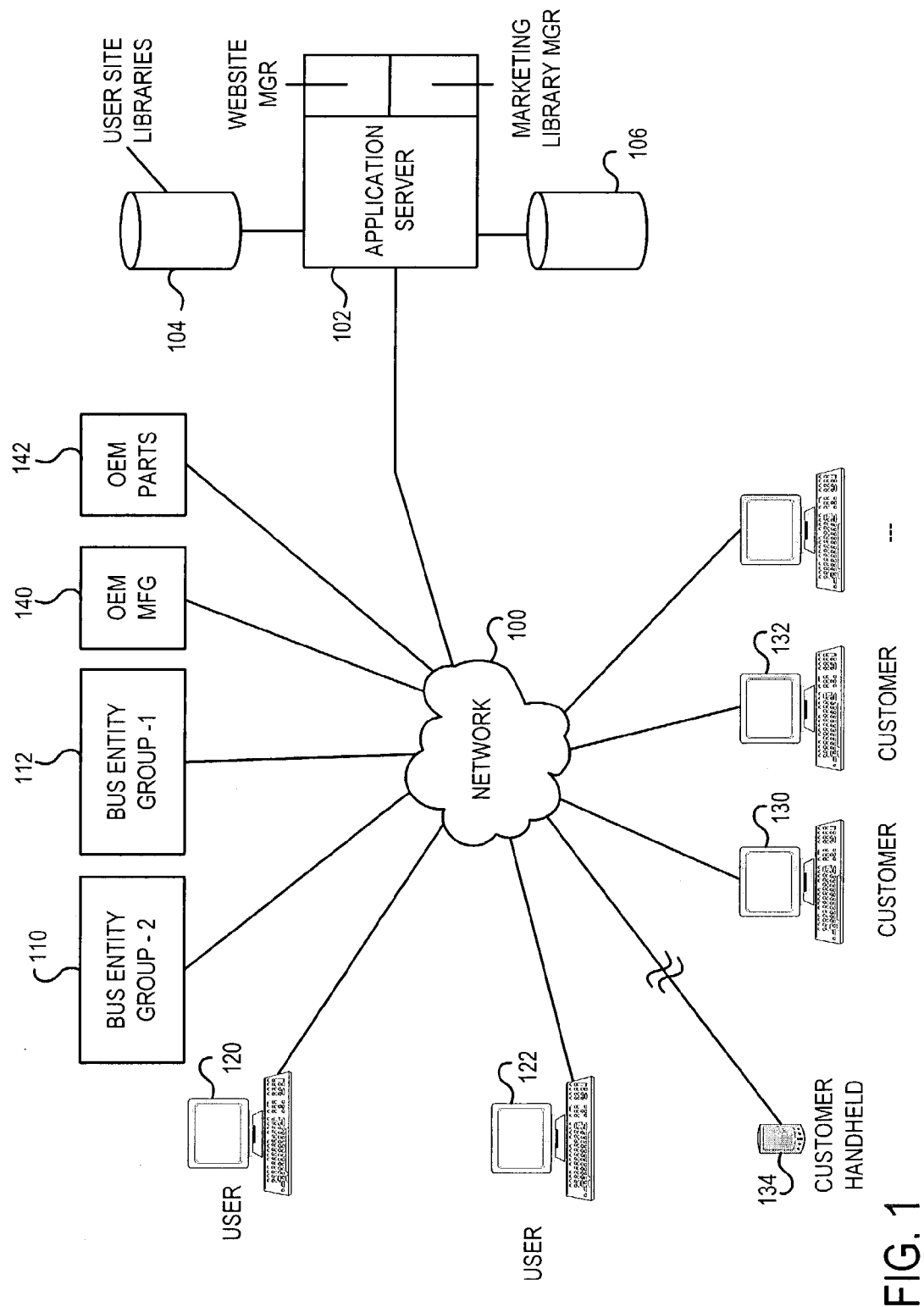
FIG. 1 is a simplified block diagram of various server and client entities each having access to a network for communications among them.

FIG. 1 is a block diagram of one example of a business application context in which the present invention can be used. The various entities illustrated in FIG. 1, further described below, can communicate on the network 100. This broadly represents any wired or wireless network such as a LAN, WAN or the Internet. On the right side an application server 102 provides services, such as web site hosting, as further described later. The application server 102 has access to database 104 for storing user web site libraries and to a second database 106 which can contain, for example, a library of marketing content available for use in various web pages.

In general, the application server 102 provides web site creation, maintenance and hosting services for one or more business entity groups, 110, 112. We will use the automobile industry as one example to illustrate a potential application of the present invention. The invention can be used, however, for user editing of any web page in virtually any environment, as further explained later. Continuing our automotive example, the business entity group 112 might be an automobile dealership or a group of automobile dealerships that maintains one or more web sites on the application server 102. Let us assume, for example, that business entity group 110 is an individual automobile dealership. An authorized individual at the dealership, for example a general manager, can use a PC, for example, to communicate via network 100 with the application server 102 to view the dealership's web site and to exercise high-level controls, for example setting permissions for which employees are authorized to edit the web site.

Continuing our example with the automobile dealership entity 110, it may have, for example, two users who are authorized to edit different pages of the dealership web site. For example, a first user represented by PC 120 might be the manager of the dealership's new car division and who has permission to edit the new car web site (or new car pages) on the dealership web site. A second user represented by PC 122 in FIG. 1 may be authorized to edit the web site (or web pages) pertaining to used car sales. There could be another user, for example, to manage parts sales and inventory (not shown). These users 120, 122 can communicate via network 100 to the application server 102 to view and edit web pages where they have authorization to do so. These users are distinguishes from customers, i.e. the general public, represented by PCs 130, 132 who typically will "visit" the dealership web site to obtain information about the dealership's products and services. The customers of course will not have permission to edit any of the web site pages, although they are likely to interact with the web site through form submissions and the like, as is conventional. The web site can also be accessed by a handheld device 134 such as a Palm Pilot, Pocket PC or web-enabled wireless telephone.

FIG. 1 also shows an OEM manufacturer entity 140 which, in our automotive example, could be an auto manufacturer such as Ford Motor Company, Toyota, or Audi. Typically, the dealership or group of dealerships (business entities 110, 112) are affiliated with one or more car manufacturers as "authorized dealers." In this regard, the manufacturer 140 may have occasion to access the application server 102 (via network 100) to provide and update information that can be used by the authorized dealers on their web sites. This might include web site content such as photographs of automobiles which can be stored in the marketing library database 106. Similarly, OEM parts manufacture 142 can provide parts information for use on the web sites of authorized parts dealers, which maybe standalone or a parts department of an automobile dealership. Further, the OEM manufacturers may have permission to access and review a restricted-access prototype or "proof" version of a web site before it is released (goes "live") to the general public. See commonly-owned U.S. patent application entitled, STAGED PUBLICATION AND MANAGEMENT OF DYNAMIC WEBPAGES, filed Jan. 24, 2003 under PCT/US04/01802 and hereby incorporated herein by this reference.

The application server in a presently preferred commercial embodiment is built on a J2EE platform, and includes a web site manager that enables the web site proprietor (business entity) and its authorized users to maintain its web site(s). The web site manager preferably is implemented as a web application, in other words the user accesses that functionality on the application server through their standard web browser. This need not necessarily be the case but it is preferred because it obviates the need for the dealership to deploy special software. For greater detail, see commonly-owned U.S. patent application entitled, METHOD AND APPARATUS FOR PROCESSING A DYNAMIC WEBPAGE, filed Jan. 24, 2003 under PCT/US04/02100. The web site manager application enables the authorized user to select the web site of interest using a friendly graphical interface, such as that illustrated in FIG. 3.

Figure 3:
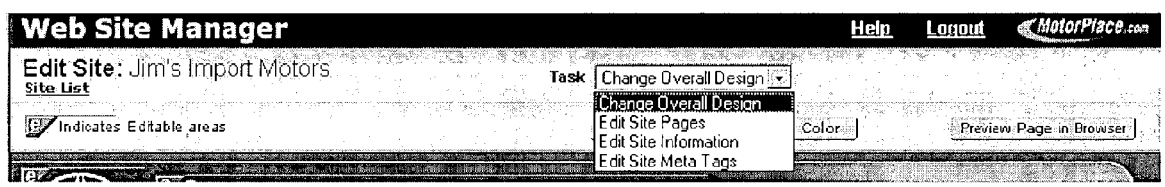
FIG. 3 is an example of a web browser window displaying a web site manager generated page enabling a user to select a web site editing task.

FIG. 3 is a partial screen shot of a web site manager application display in a web browser window enabling a remote business entity (or its authorized user) to edit the entity's web site. In one embodiment of a web site manager, the user is presented with a summary page in which the user can choose to enter edit mode for a particular site by clicking "Edit Site." Choosing this option brings the user to the site's work-in-process ("WIP") state. The WIP version of the website is editable, and is separately stored on the application server from the "live" web site which is the version accessible by the general public. Referring again to FIG. 3, we next assume that the user selects "Change Overall Design." In that task screen the user can make design changes that apply to all pages within the site. As indicated in FIG. 3, the user can preview a selected page in the browser by clicking on that button.

Figure 4:
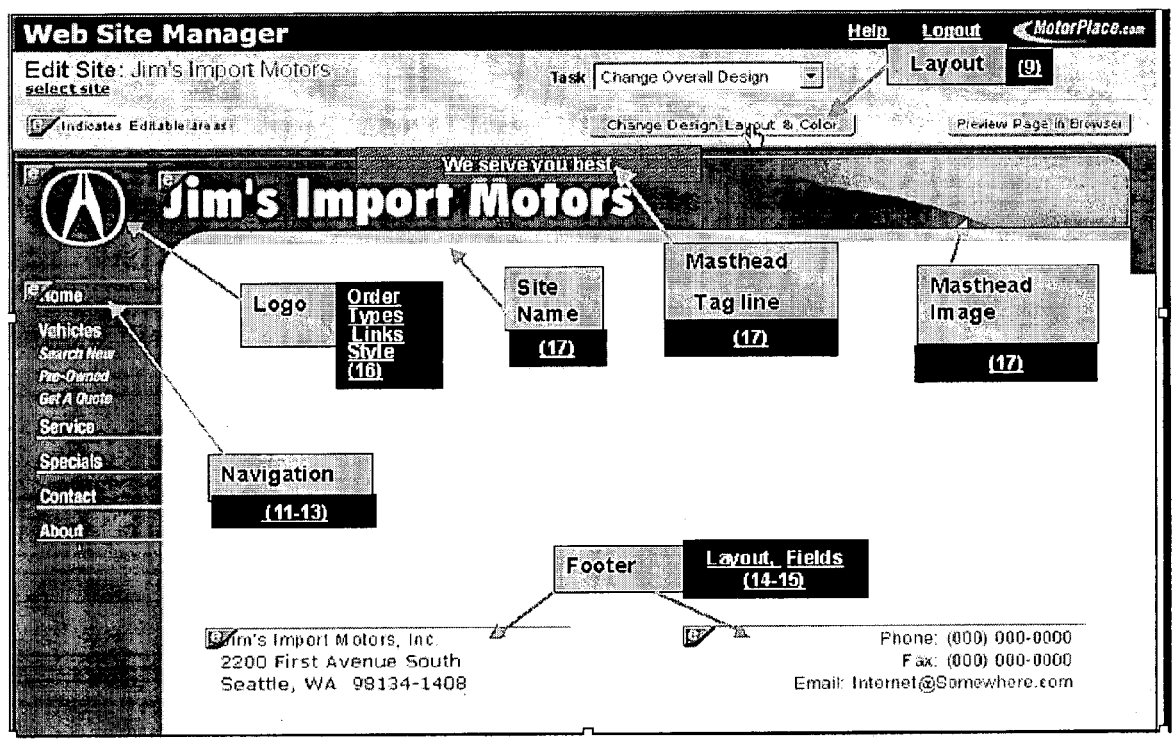
FIG. 4 is an example of a web browser window displaying a web site manager generated screen enabling an authorized user to change the overall design of a web site.

FIG. 4 illustrates an example of a change overall design screen. This screen display comprises two frames, the top one indicating options available to the user ("Change Design Layout & Color", "Preview Page in Browser", etc.). The lower frame displays the selected web page and in this panel certain editable elements are identified by a distinctive icon comprising a lower case "e" and a graphic symbol similar to a truncated button. For example, in FIG. 4, the logo and the site name are indicated as editable areas, whereas the masthead image is not editable. The masthead image is one element that the page designer wishes to maintain consistently over the site.

Figure 5A:
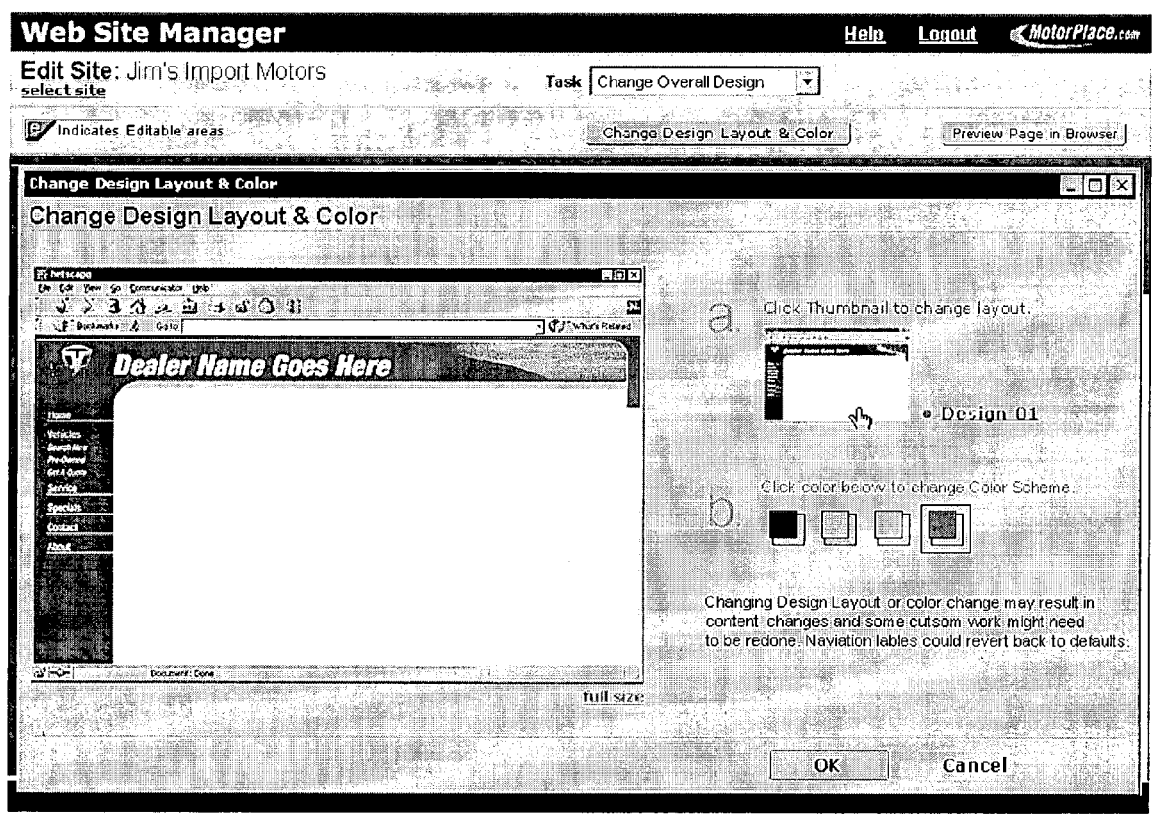
FIG. 5A and FIG. 5B illustrate a web site manager screen enabling a remote user to change the design layout and color scheme of the web site.
Figure 5B:
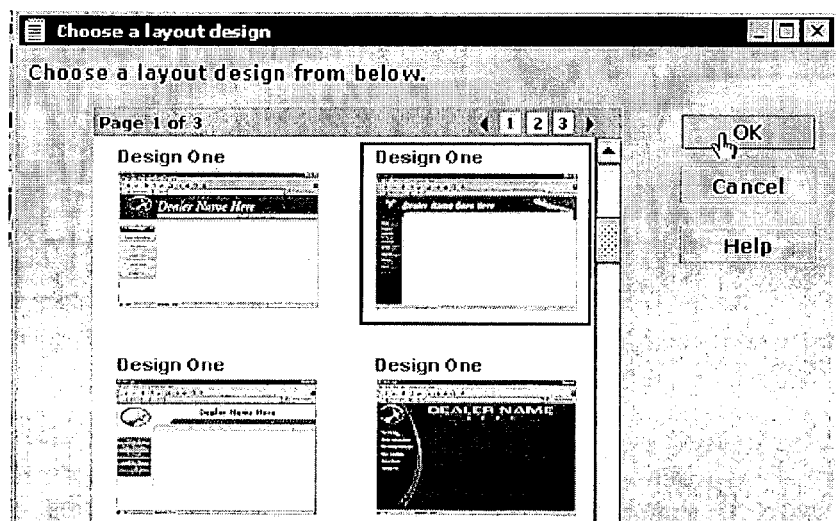

If the user chooses "Change Design Layout & Color", the user is presented with a screen like that shown in FIG. 5A, where he can choose color schemes for the chosen design or select design layouts within the selected design family. FIG. 5B shows a panel for choosing a layout design, each of the available designs being displayed in thumbnail form.

Figure 6:
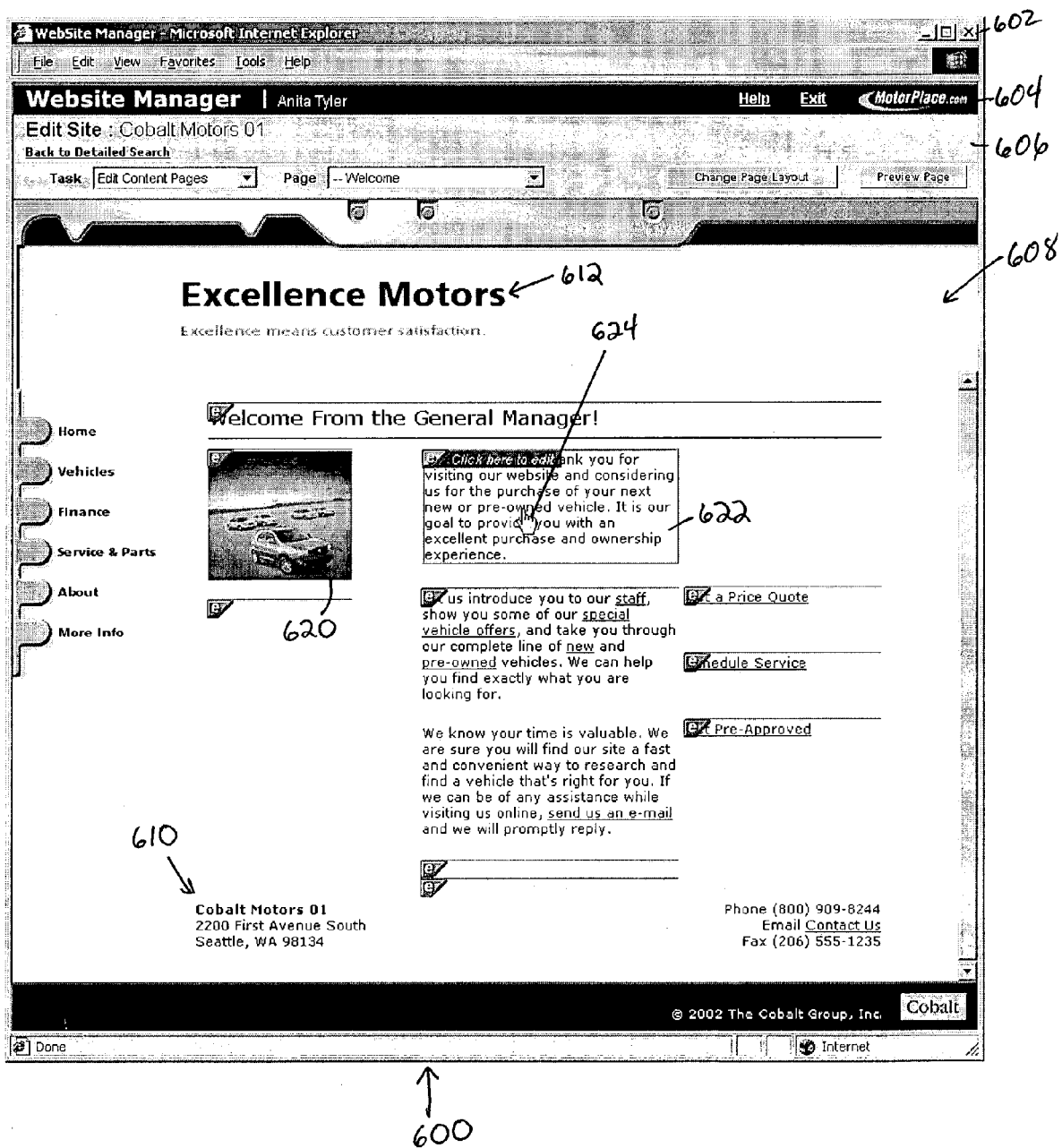
FIG. 6 is an example of a web browser window displaying a web site manager generated screen enabling an authorized user to select a cell for editing.

Next we assume that the user is authorized to do so and has selected an individual page for editing. Referring now to FIG. 6, the title bar at the top indicates that this illustrates a screen display in the Internet Explorer web browser. The next title bar below the top shows that the user is in a session with the web site manager application and the logged-in user ("Anita Tyler") is identified. The top portion of that window ("Edit Site: Cobalt Motors 01") presents the user with various pull-down menus, including an option to edit content pages as shown. In the next panel ("Excellence Motors") a web page from the Excellence Motors dealership is displayed. This is an editable web page as indicated by the edit icons described above. Certain cells of the web page are editable while others are not. For example, the dealership name and address shown at the lower left is not flagged as editable, because it is to remain constant across all pages of the web site. The same is true of the banner "Excellence Motors" near the top of the page. Other cells are editable, as indicated by the icon, including the photograph 620 and the text field 622. In this specification and the appended claims, we refer to a web page "cell" as any content element that can be processed or rendered by a web browser. Examples include text, photographs or other graphic material, movies, audio clips, etc. Continuing our example, note that the text field 622 is surrounded by a boundary box (whereas other text cells are not). This is a consequence of the cursor 624 (a hand) floating over the editable text cell. When the cursor floats over this field, the boundary box appears, and the editable icon expands to display the message "Click Here to Edit" as illustrated.

Figure 7:
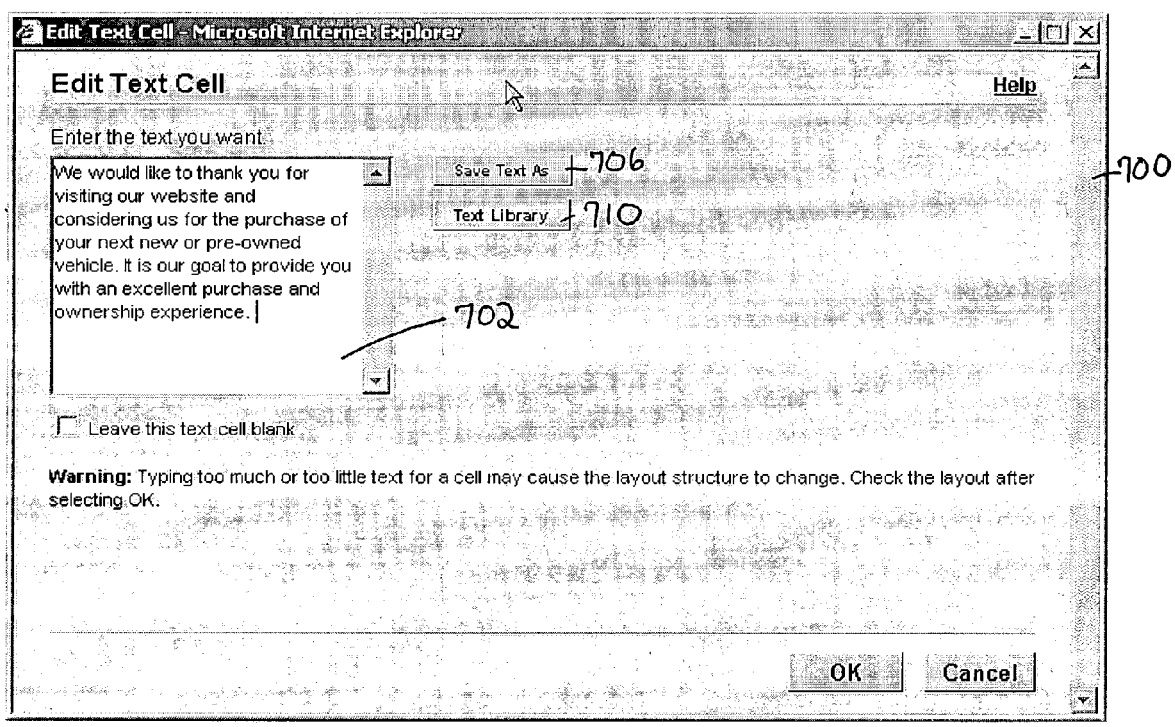
FIG. 7 is an example of a an Edit Text Cell pop-up window.

Next the user clicks on the specified field to edit the text cell 622. When the user chooses to edit the text cell 622, a new window or panel 700 pops up as indicated in FIG. 7. This is just one example of a edit text cell panel. In this simple example, the user is invited to enter the desired text in the field provided. Other features can be implemented in the edit text cell panel, for example providing a choice of font size or style. On the other hand, it is often preferred that the style of the text be constrained to that defined by the page designer so that a consistent and professional appearance is maintained throughout the web pages and the site. Exactly what changes in content and style will be permitted is determined by the layout or template created by the designer. In general, the editing described here is intended for a user who is not a computer programmer or even very familiar with internet technologies.

Figure 8:
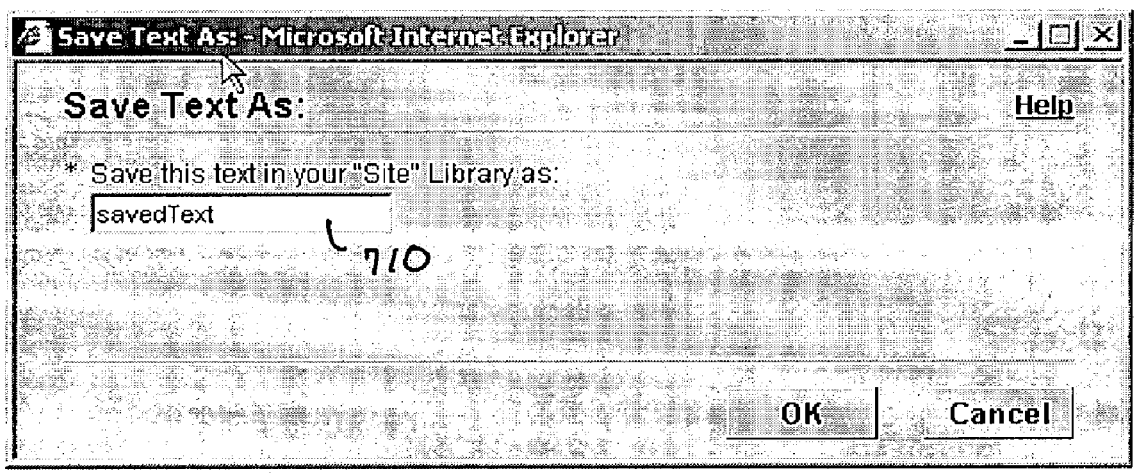
FIG. 8 is an example of a Save Text As pop-up window for saving selected text to a site library.
Figure 9:
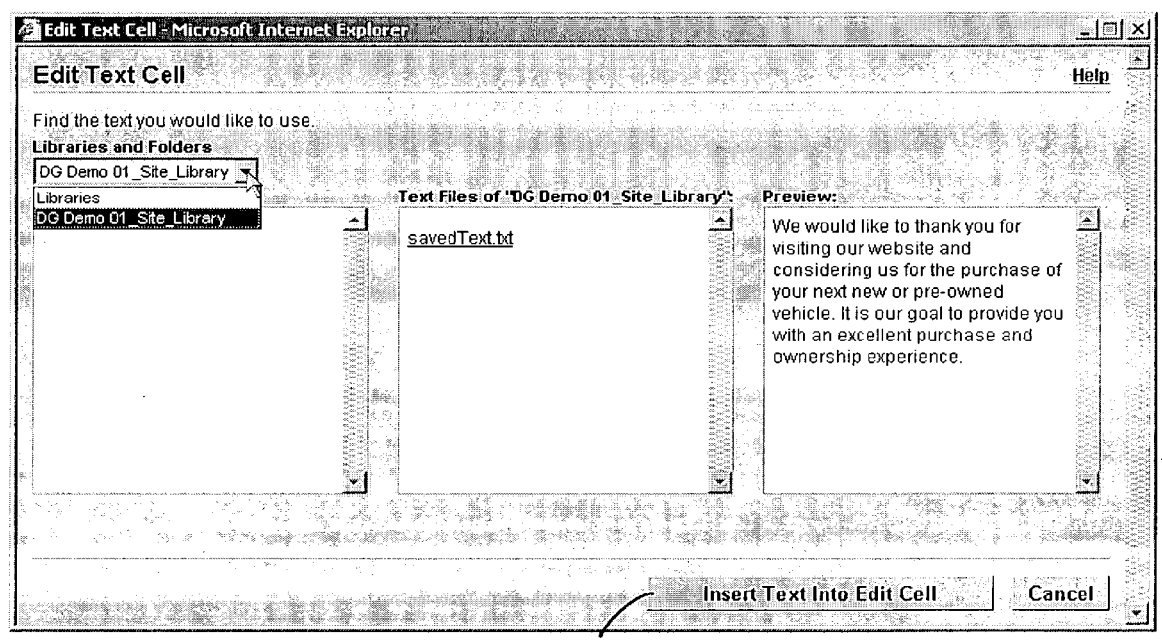
FIG. 9 is an example of a pop-up browsing window for selecting predetermined text from a site library and inserting the text into a cell.

The edit text cell panel 700 includes a field 702 for entering text, as mentioned, in a "save text as" button 706. As shown in FIG. 8, clicking the button 706 activates the "save text as" panel to enable the user to save the text entered in 702 in the site library under a name entered by the user in panel 710. This action will result in saving the text (702) in the associated site library 104 in FIG. 1. Rather than type new text into the panel 702, the user can click "text library" button 710 to access the text library of pre-existing content. Button 710 activates the panel shown in FIG. 9 which enables the user to browse the libraries and folders of existing content and preview it. Once the desired text is selected, the user clicks on button 902 to insert the selected text into the editable cell (622 in FIG. 6).

Figure 10:
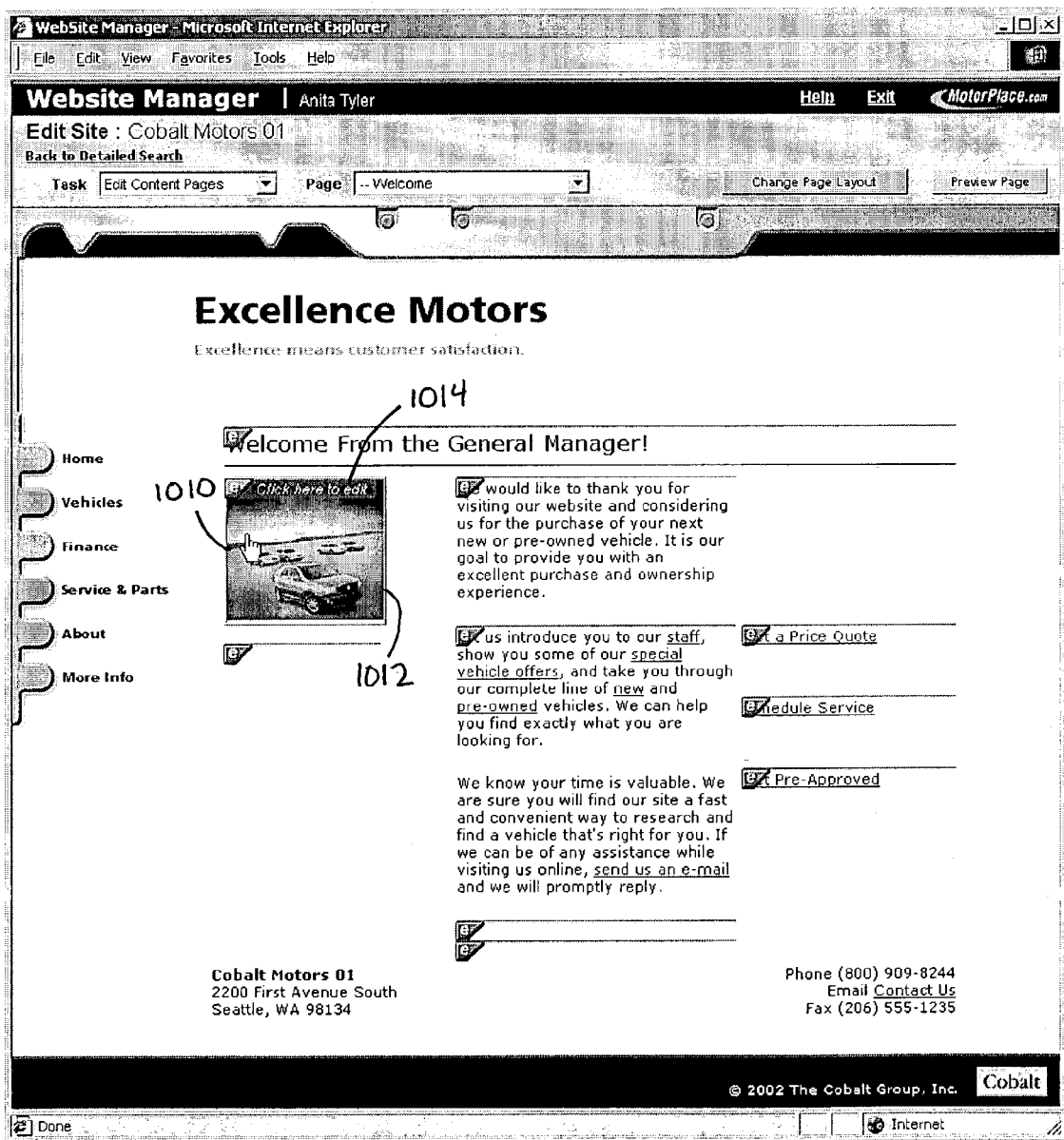
FIG. 10 is another example of a web browser window displaying a web site manager generated screen enabling an authorized user to select a cell for editing.
Figure 11:
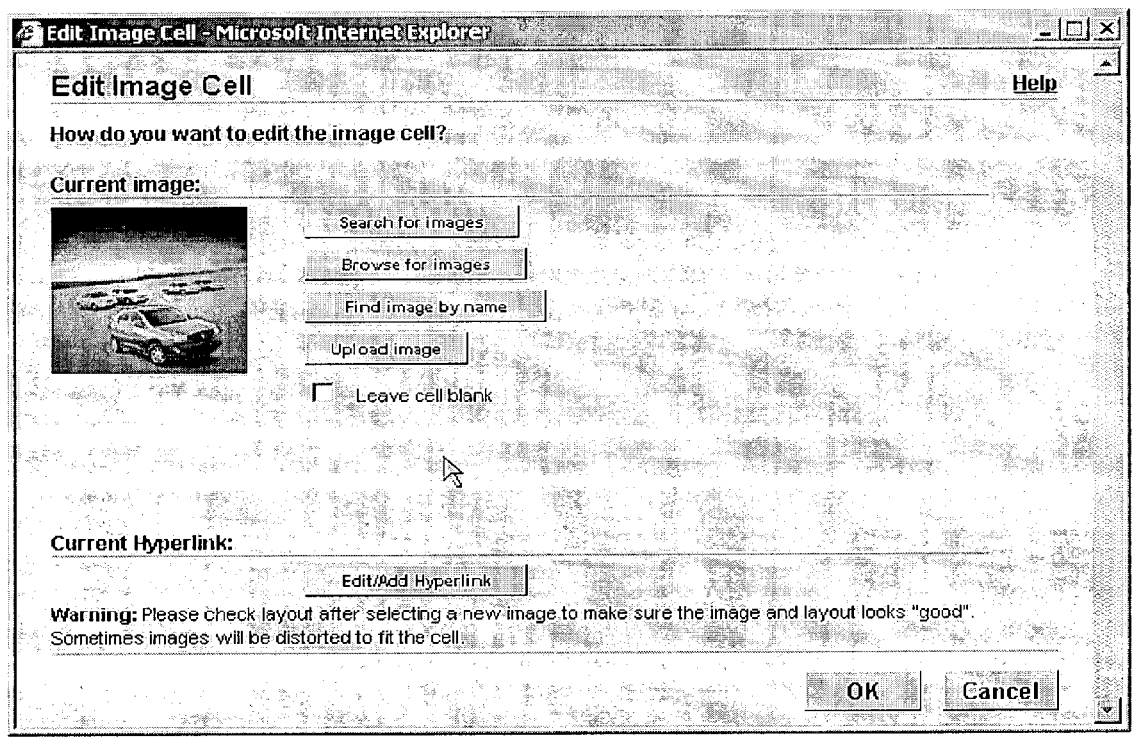
FIG. 11 is an example of a pop-up window for editing an image cell.
Figure 12:
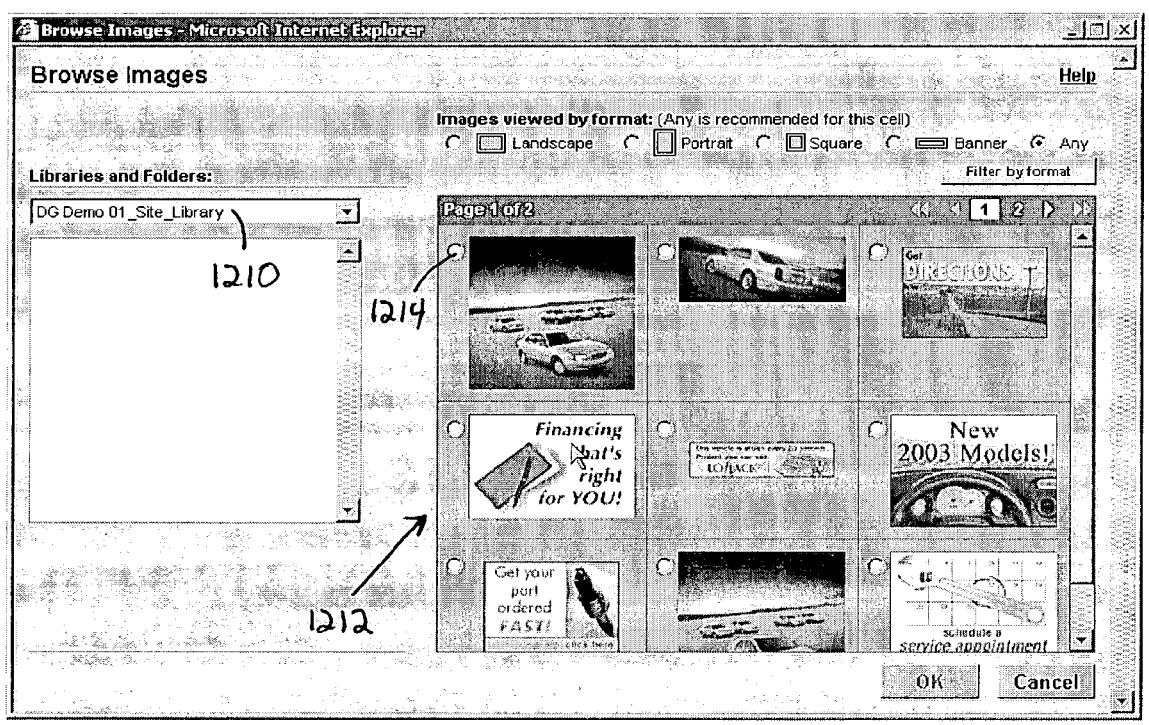
FIG. 12 is an example of a pop-up browsing window for selecting an image from a site library.

Referring now to FIG. 10, the cursor 1010 is now floating over an image cell 1012. As before in the case of a text cell, floating the cursor activates a boundary around the editable cell and the "click here to edit" button 1014. When the user clicks that button, an edit image cell panel pops up as shown in FIG. 11. In this example, the user is presented with options to search for images, browse for images, find an image by name (in the site library) or upload a new image. (Or the user could check the box to leave the cell blank.) If the user chooses to browse images, another panel pops up as illustrated in FIG. 12. This panel enables the user to browse through libraries and folders on the site library as indicated at 1210 and upon selecting a library, a collection of images is displayed (in thumbnails) as indicated as 1212. There may be multiple pages of thumbnail images if they are numerous, and the user can scroll through the images as desired. A simple radio button can be used to select a desired image, for example a radio button 1214. Other illustrative features will be apparent to the reader upon closer inspection of the drawing figures.

Figure 2:
FIG. 2 is an example of a form payload for submission to a web server in connection with remote editing of a web page in accordance with the present invention.

When the desired editing step is completed, the user clicks the corresponding "OK" button or the like, and the results are submitted to the server, for example using standard HTTP form submission protocols (again, so a standard web-browser can be used for remote editing without supplemental software). FIG. 2 illustrates the payload of such a submission, in this case a text cell edit. Referring to FIG. 2, the form includes identifiers of the web site, web site version and edited cell, the new text (content) and optionally the old text (prior to editing).

The types of editing activities illustrated in the drawing figures described above can be carried out by the user, in accordance with the present invention, in a standard web browser running on the user's machine, without having to install external software such as JAVA applets or browser plug-ins. This feature is accomplished by enabling the desired editing functionality within the (editable) web page itself, using a markup language. In a presently preferred commercial embodiment, Java Server Page ("JSP") technology is used in the application server to generate the editable page. The editable page employs a standard markup language so that it will execute properly in a standard web browser, such as IE.

In one illustrative implementation, the JSP code invokes custom tags to implement the editor in HTML and DHTML standard markup languages. To further describe the invention, sample code is shown below for implementing a text cell edit feature. In view of this description of the technical approach taken in a presently preferred embodiment, those skilled in the art will readily appreciate various ways to implement editing of other types of cells, such a pictures or graphics, as well as other equivalent methods and technologies to implement remote editing generally in accordance with the invention, to implement WYSIWYG editor behavior in a standard web browser without requiring additional software. This has the advantage of enabling editing by a user on virtually any PC or other web-enabled device; no special software is needed. Neither is programming expertise necessary as the editing functionality is a visual-editing paradigm with WYSIWYG feedback in essentially real time.

Figure 13:
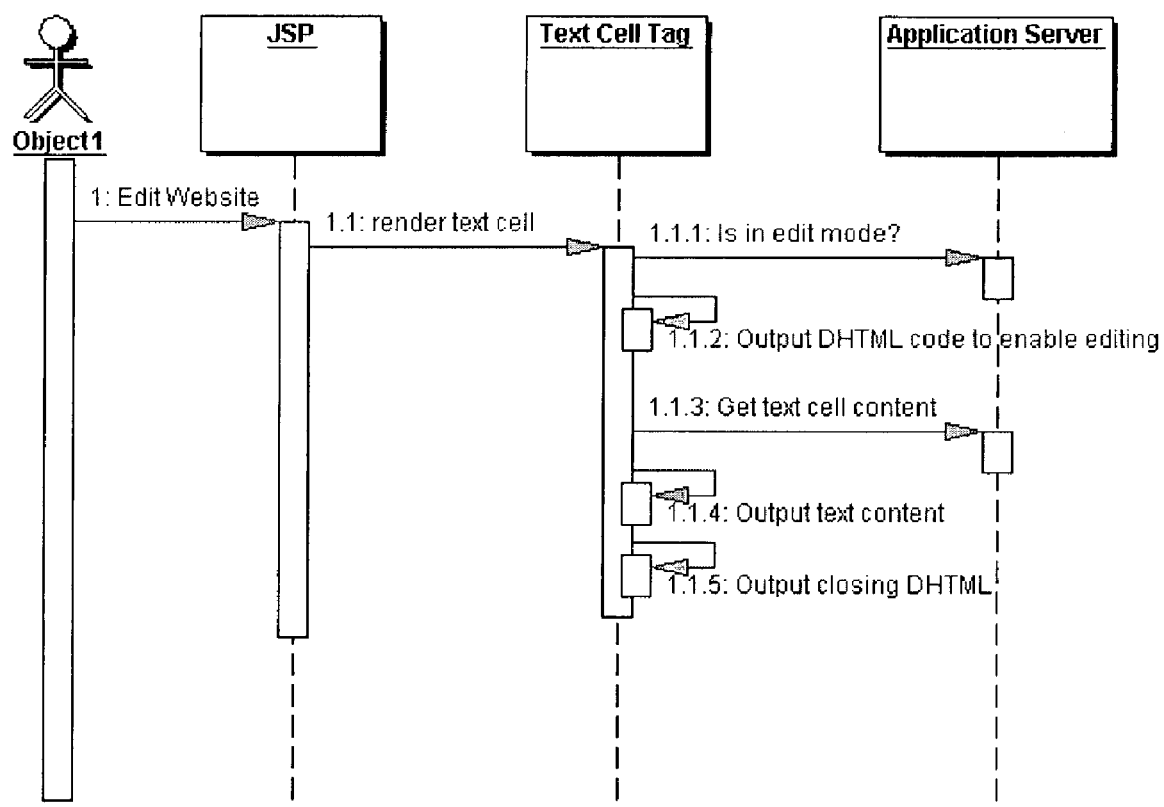
FIG. 13 is a Sequence Diagram illustrating a text cell rendering process.

FIG. 13 is a sequence diagram that summarizes the operations described above. At the left side, the stick figure represents a user operating a web browser who has requested to edit a web site. The edit web site request invokes the JSP at the web server. The JSP in turn executes the text cell tag (or other custom tag, such as a graphic cell tag, as appropriate). The text cell tag logic confirms that the web site is in edit mode by querying the application server and, if so, begins generating HTML/DHTML code to enable editing. The code is output to a buffer where the editable web page is assembled. The text cell tag logic first gets the existing text cell content from the application server, see loadCell( ) method, and adds it to the buffer. The JSP invokes various methods as shown in the illustrative code below to generate the editable page. The editable page could comprise, for example, the HTML DIV tag which defines the editable cell boundaries, highlight behavior, and causes the pop-up windows to appear in the browser in connection with editing the cell as described above.

In the following code example, we assume that a user has logged in to the server platform and has permission to edit the page he selects. The following JSP code creates the HTML that enables editing content at the browser: This is implemented using a custom tag, called text-cell (the text cell editing tag).

The opening tag includes default text for the cell:

<CobaltDesign:text-cell cellName="welcome_bodytext1">We would like to thank you for visiting our website and considering us for the purchase of your next new or pre-owned vehicle. It is our goal to provide you with an excellent purchase and ownership experience.</CobaltDesign:text-cell>

The code for the tag (text-cell) begins as follows:

package com.cobaltgroup.products.webengine.web.tag;

import java.net.URLEncoder;

import javax.servlet.jsp.JspException;

import javax.servlet.jsp.tagext.BodyContent;

import com.cobaltgroup.foundation.exception.CobaltSystemException;

import com.cobaltgroup.products.webengine.exception.UnknownCellException;

import com.cobaltgroup.products.webengine.vo.SiteContextAdapter;

import com.cobaltgroup.products.webengine.vo.TextCell;

import com.cobaltgroup.products.webengine.vo.WebengineDelegate;

Following is standard format commenting:

```
* Tag that inserts text.
*
* <p>If the site doesn't have custom text for the cell, the text within
* the body of the tag is shown instead.
*
* <p>Usage example:
* <pre>
     <design:text-cell cellName="abbott" maximumLength="50" >
     This default code shows up if there's no custom text in the site data.
     </design:text-cell>
     <design:text-cell cellName="costello">
     </design:text-cell>
* </pre>
*
* <h4>Tag Parameters:</h4>
* <p><table border="1" align="center" width="95%" cellpadding="3">
*
* <tr valign=top>
* <td width=25%><b>cellName</b></td>
* <td width=20%>required</td>
* <td>
* The name of this cell.  This MUST be unique with a layout.
* </td>
* </tr>
*
* <tr valign=top>
* <td width=25%><b>maximumLength</b></td>
* <td width=20%>optional</td>
* <td>
* Limits the number of characters allowed in the text cell.
* Extra text is truncated.
* If no value is specified the text length is unlimited.
* </td>
* </tr>
*
* </table></p>
    public class TextCellTag extends DesignBodyTag implements EditableTag {
    public String cellName;
    public String maximumLength;
    private TextCell cell;
    private boolean editable = true;
    private boolean useDefault = false;
    private boolean useCustomText = false;
    private boolean hasCellAlready = false;
    private static final String NO_CELL_FLAG = "none";
    private static final String EDITOR_URL =
        "/websitemanager/ControllerServlet?requestPath=EditTextcell";
    /**
     * Default constructor.
     */
    public TextCellTag( ) {
        super( );
    }
    /**
     * reintialize private variables to null
     */
    public void release( ) {
        super.release( );
        this.cellName = null;
        this.maximumLength = null;
        this.cell = null;
        this.editable = true;
        this.useDefault = false;
        this.useCustomText = false;
        this.hasCellAlready = false;
    }
    public int doStartTag( ) {
        context =
            SiteContextAdapter.getInstance(
                pageContext.getRequest( ),
                pageContext.getSession( ));
        webengine = WebengineDelegate.getInstance(context);
        return EVAL_BODY_BUFFERED;
    }
    public void doInitBody( ) {
        loadCell( );
    }
```

```
public int doEndTag( ) throws JspException {
    startRendering( );
    endRendering( );
    return EVAL_PAGE;
/**
 * Returns the string value of the cellName attribute.
 */
public String getCellName( ) {
    return this.cellName;
}
/**
 * Set the MaximumLength attribute.
 *
 * @param maximumLength the value of maximumLength
 */
public void setMaximumLength (String maximumLength) {
    this.maximumLength = maximumLength;
}
/**
 * Returns the string value of the MaximumLength attribute.
 */
public String getMaximumLength( )
    return this.maximumLength;
/**
 * Initializes the tag's cell data.
 */
private void loadCell( ) {
    try {
        cell = (TextCell) webengine.getCell(getCellName( ));
        if (cell != null) {
            hasCellAlready = true;
            //If cell contains text and isBlank is false then only display the
            // text in cell
            if (cell.getIsBlank( ))
            {
                useCustomText = false;
                useDefault = false;
            }
            else if (cell.getText( ).trim( ).length( ) > 0)
            {
                useCustomText = true;
            } else {
                useDefault = true;
            }
        } else {
            hasCellAlready = false;
            useDefault = true;
        }
        editable = true;
    } catch (UnknownCellException x) {
        useCustomText = false;
        useDefault = true;
        editable = true;
    } catch (CobaltSystemException x) {
        dealWithProblem(x);
        useCustomText = false;
        useDefault = false;
        editable = false;
    } catch (RuntimeException x) {
        x.printStackTrace( );
        dealWithProblem(x);
        useCustomText = false;
        useDefault = false;
        editable = false;
    }
/**
 * Returns the text string trimmed to size.
 */
private String getText( ) {
    String text = cell.getText( );
    try {
        int length = Integer.parseInt(maximumLength);
        return text.substring(0, length);
    } catch (RuntimeException x) {
        return text;
    }
}
```

-continued

```
    /**
     * Start rendering the tag into HTML.
     */
    protected int startRendering( ) throws JspException {
//      loadCell( );
        if (editable && shouldWrapInPageEditMode( ))
            startWrapper(this);
        if (useCustomText) {
            printOut(getText( ));
        } else if (useDefault) {
            String defaultText = getDefaultText( );
            //System.out.println("Default Text is:"+ defaultText);
            printOut(defaultText);
        } else {
            printOut(" ");
        }
        return 0;
    }
    /**
     * Convenient way to print editor launcher wrapper.
     * It relies on the EditableTag interface.
     * Starts HTML code needed to generate editor launcher.
     *
     * @see com.cobaltgroup.products.webengine.web.tag.EditableTag
     */
    protected void startWrapper(EditableTag eTag) {
        printOut(
            beginEditorWrapper(
                eTag.getLauncherName( ),
                eTag.getLauncherUrl( ),
                eTag.getLauncherSize( ),
                getTipText( )));
        return;
    /**
     * Precedes DesignTag with editor launcher code.
     *
     * Output is of the form:<code><pre>
     * <DIV ID="sectionOuter_a" CLASS="boundingOuterSection"
     * onMouseOver="boundingOn('a');" onMouseOut="boundingOff('a');"
     * onClick="open popup js goes here">
     * <DIV CLASS="boundingButton" onMouseOver="boundingOn('a');"
     * onMouseOut="boundingOff('a');" onClick=""><IMG SRC=
     * "/resources/images/edit_off.gif" WIDTH="22" HEIGHT="15"
     * NAME="edit_a" BORDER=0 ></DIV>
     * <DIV ID="tooltip_a" CLASS="boundingTooltip"><P
CLASS="boundingSmallText">
     * Click here to edit</DIV>
     * <DIV ID="sectionInner_a" CLASS="boundingInnerSection">
     * <DIV></pre></code>
     */
    public static String beginEditorWrapper  ( String launcherName
                                             , String launcherUrl
                                             , String launcherSize
                                             , String launcherTooltipText )
{
        StringBuffer buffer = new StringBuffer( );
        buffer.append("<DIV ID=\"sectionOuter_"+launcherName+"\"
CLASS=\"boundingOuterSection\" "); // +1
        buffer.append("onMouseOver=\"boundingOn(' "+launcherName+" ');\" ");
        buffer.append("onMouseOut=\"boundingOff(' "+launcherName+" ');\" ");
        buffer.append("onClick=\"var "+launcherName+" = new
popupObj(' "+launcherUrl+" ' , ' "+launcherSize+" ');");
        buffer.append("openWin("+launcherName+");\">\n");
        buffer.append("    <DIV CLASS=\"formatWrapper\">\n");
        buffer.append("      <DIV ID=\"sneezeguard_"+launcherName+"\"
CLASS=\"sneezeguard\"><TABLE WIDTH=\"100%\" HEIGHT=\"100%\"
CELLPADDING=\"0\"CELLSPACING=\"0\"
BORDER=\"0\"><TR><TD> </TD></TR></TABLE></DIV>\n");
        buffer.append("      <DIV CLASS=\"boundingButton\">"); // +2
        buffer.append("<IMG SRC=\""+ADORN_IMAGE+"\"
WIDTH=\""+ADORN_WIDTH+"\" HEIGHT=\""+ADORN_HEIGHT+"\"
NAME=\"edit_"+launcherName+"\" BORDER=0 >");
        buffer.append("</DIV>\n"); // -2
        buffer.append("      <DIV ID=\"tooltip_"+launcherName+"\"
CLASS=\"boundingTooltip\"><P CLASS=\"boundingSmallText\">"+
launcherTooltipText +"</DIV>\n"); // +-3
        buffer.append("    </DIV>\n");
        buffer.append("
```

-continued

```
<SCRIPT>addCellNamez(\""+launcherName+"\");</SCRIPT>\n");
        buffer.append("    <DIV ID=\"sectionInner_"+launcherName+"\"
CLASS=\"boundingInnerSection\"\n"); // +4
        buffer.append("      <DIV>\n"); // +5
        return buffer.toString( );
} /**
 * Get the default text, whether it exists or not.
 */
private String getDefaultText( ){
    BodyContent content = getBodyContent( );
    String value = "";
    if (null != content){
        value = content.getString( );
    }
    return value;
/**
 * Finish rendering the tag into HTML.
 */
protected int endRendering( ) throws JspException {
    if (editable && shouldWrapInPageEditMode( ))
        endWrapper(this);
    return EVAL_PAGE;
}
/**
 * Convenient way to print editor launcher wrapper.
 * It relies on the EditableTag interface.
 * Completes HTML code needed to generate editor launcher.
 *
 * @see com.cobaltgroup.products.webengine.web.tag.EditableTag
 */
protected void endWrapper(EditableTag eTag) {
    printOut(finishEditorWrapper( ));
    return;
/**
 * Follows DesignTag with editor launcher code.
 */
public static String finishEditorWrapper ( )
{
    return "\n      </DIV>\n    </DIV>\n</DIV>\n"; // -5 -2 -1
}
/**
 * Returns the editor url as a string.
 */
public String getLauncherUrl( ) {
    StringBuffer buffer = new StringBuffer( );
    buffer.append (EDITOR_URL);
    buffer.append("&" + SiteContextAdapter.CELL_NAME + "=");
    buffer.append(getCellName( ));
    buffer.append("&" + SiteContextAdapter.CELL_ID + "=");
    if (hasCellAlready) {
        buffer.append(cell.getId( ).toHexString( ));
    } else {
        buffer.append(NO_CELL_FLAG);
buffer.append("&defaultText="+URLEncoder.encode(getDefaultText( )));
    }
    return buffer.toString( );
}
/**
 * Returns the name of the window size of the editor launcher.
 */
public String getLauncherSize( ) {
    return SIZE_SMALL;
}
/**
 * Returns the name of the editor launcher.
 */
public String getLauncherName( ) {
    return getCellName( );
// this should be unique for each page} // TextCellTag
```

Below is the resulting HTML that denotes the text cell at the browser. The initial DHTML "DIV" tag creates the bounding box that is displayed on the browser—see 622 in FIG. 6. When the user clicks on the box, as described above, it opens a new browser window based on the parameter in the popupObj( ) method call.

```
<DIV ID="sectionOuter_welcome_bodytext1" CLASS="boundingOuterSection"
onMouseOver="boundingOn('welcome_bodytext1');"
onMouseOut="boundingOff('welcome_bodytext1');" onClick="var
welcome_bodytext1 = new
popupObj('/websitemanager/ControllerServlet?requestPath=EditTextCell&cellNa
me=welcome_bodytext1&cellId=none&defaultText=We+would+like+to+thank+you+for
+visiting+our+website+and+considering+us+for+the+purchase+of +your+next+new+
or+pre-
owned+vehicle.++It+is+our+goal+to+provide+you+with+an+excellent+purchase+an
d+ownership+experience.','sm1');openWin(welcome_bodytext1);">
    <DIV CLASS="formatWrapper">
        <DIV ID="sneezeguard_welcome_bodytext1" CLASS="sneezeguard"><TABLE
WIDTH="100%" HEIGHT="100%" CELLPADDING="0" CELLSPACING="0"
BORDER="0"><TR><TD> </TD></TR></TABLE></DIV>
        <DIV CLASS="boundingButton"><IMG
SRC="/resources/images/edit_off.gif" WIDTH="22" HEIGHT="15"
NAME="edit_welcome_bodytext1" BORDER=0 ></DIV>
        <DIV ID="tooltip_welcome_bodytext1" CLASS="boundingTooltip"><P
CLASS="boundingSmallText">Click here to edit</DIV>
    </DIV>
    <SCRIPT>addCellName("welcome_bodytext1");</SCRIPT>
    <DIV ID="sectionInner_welcome_bodytext1" CLASS="boundingInnerSection">
        <DIV>
```

We would like to thank you for visiting our website and considering us for the purchase of your next new or pre-owned vehicle. It is our goal to provide you with an excellent purchase and ownership experience.

```
            </DIV>
        </DIV>
    </DIV>
```

The same tag also creates the following HTML when it is invoked with editing turned off(published):

We would like to thank you for visiting our website and considering us for the purchase of your next new or pre-owned vehicle. It is our goal to provide you with an excellent purchase and ownership experience.

It will be obvious to those having skill in the art that many changes may be made to the details of the above-described embodiments without departing from the underlying principles of the invention. The scope of the present invention should, therefore, be determined only by the following claims.

The invention claimed is:

1. An editable web page computer software product comprising a file stored on machine-readable media, the file including code defining a web page expressed in a predetermined markup language suitable for download from a server and processing in a standard web browser program executing on a client machine without the use of external code, the editable web page file including:
   (a) markup language code defining selected elements of the web page, including a content cell;
   (b) markup language code for displaying a visual indication that the content cell is an editable cell when the web page is displayed by the web browser;
   (c) markup language code for displaying an editing panel in response to user selection of the editable cell for editing without downloading another web page file from the server;
   (d) markup language code for capturing and storing editing actions taken by the user in the editing panel for modifying the editable cell without downloading another web page file from the server; and
   (e) markup language code for submitting the captured editing actions to a web server without downloading another web page file from the server.

2. A web page according to claim 1 wherein the editing actions include entering new text from a keyboard.

3. A web page according to claim 1 wherein the editing actions include importing a predetermined local text file.

4. A web page according to claim 1 wherein the editable cell is a graphic cell; and the editing actions include providing a new graphic to populate the editable graphic cell.

5. A web page according to claim 1 wherein the editable cell has boundaries defined by a DHTML DIV tag.

6. A web page according to claim 5 wherein the code for displaying an editing panel calls a JavaScript code that executes on the client machine.

7. A web page according to claim 6 wherein the DHTML DIV tag defines actions responsive to mouse-in and mouse-out of the editable cell boundaries.

8. A web page according to claim 1 wherein the editable cell contains one of a Flash, pdf, audio, video, or graphic content; and the editing actions include providing new content to populate the editable cell.

9. A dynamic web application computer software product stored on machine-readable media, the web application including code for generating an editable web page for download to a standard web browser executing in a client machine in response to a request from the web browser, without employing any external code on the user's computer, wherein the editable web page includes embedded code to invoke a pop-up editing window in the web browser responsive to a user request for editing the web page without downloading a second web page.

10. A dynamic web application according to claim 9 wherein the web application loads the content of an editable cell into the editable web page and appends code into the editable web page for visually distinguishing the editable cell when the editable web page is interpreted and displayed on the web browser.

11. A dynamic web application according to claim 10 wherein the application is implemented in a platform-independent language.

12. A dynamic web application according to claim 10 wherein the application is implemented in a Java Server Page technology.

13. A dynamic web application according to claim 10 wherein the application is implemented in an Active Server Page technology.

14. A dynamic web application according to claim 10 wherein the application further appends code to invoke a pop-up edit cell window in the web browser responsive to the user selecting the editable cell for editing in the web browser.

15. A dynamic web application according to claim 14 wherein the code to invoke a pop-up edit cell window in the web browser enables user selection of new content for insertion into the selected editable cell.

16. A visual, wysiwyg method of editing a web page in a remote user's client web browser without employing any external code on the user's computer, the method comprising the steps of:

designing and storing a web page on a web server;

in the web page, designating an editable cell;

responsive to a request from the user's web browser to edit the web page:

confirming that the user has permission to edit the web page;

downloading the requested web page to the browser in an editable form including at least one editable cell without generating a program in the server associated with the downloaded web page;

editing the web page locally, using the client web browser, without transmitting a request back to the web server to execute a program associated with the downloaded web page;

after editing the web page locally, transmitting results of said editing to the web server, including an identifier of the web site, a version of the web site, an identifier of the web page edited, an identifier of an editable cell; and indicia of new content for the identified editable cell; and updating the web page stored on the web server to incorporate the indicated new content of the identified editable cell.

17. A method according to claim 16, wherein the web page includes a plurality of locally editable cells.

18. A method according to claim 17, wherein the web page has embedded editing logic for at least one of the editable cells and said editing the web page locally includes executing the embedded editing logic by the web browser.

19. A method according to claim 18, wherein the execution of the embedded editing logic by the web browser does not send a request to the server.

20. A method according to claim 18, wherein the execution of the embedded editing logic by the web browser does not cause a program to be executed on the server.

21. A method according to claim 16, wherein the web page includes a plurality of locally editable cells each identified by a corresponding editing icon.

22. A method according to claim 21, wherein clicking the editing icon does not cause additional communication with the server.

23. A method according to claim 21, wherein clicking the editing icon does not cause a program to be executed on the server.

* * * * *

UNITED STATES PATENT AND TRADEMARK OFFICE
CERTIFICATE OF CORRECTION

PATENT NO. : 7,000,184 B2
DATED : February 14, 2006
INVENTOR(S) : Matveyenko et al.

It is certified that error appears in the above-identified patent and that said Letters Patent is hereby corrected as shown below:

Column 1,
Line 29, change "comprises" to -- comprise --.
Line 61, change "an" to -- as --.

Column 2,
Line 15, change "applications," to -- applications; --.
Line 25, change "editor" to -- editors --.

Column 3,
Line 36, change "wysiwyg" to -- WYSIWYG --.

Column 4,
Line 16, change "of a an" to -- of an --.

Column 5,
Line 12, change "distinguishes" to -- distinguished --.
Line 34, change "maybe" to -- may be --.
Line 50, change "their" to -- a --.

Column 6,
Line 60, change "edit a" to -- edit an --.

Column 7,
Line 7, change "in" to -- and --.

Column 8,
Line 4, change "such a pictures" to -- such as pictures --.
Line 32, change "highlight" to -- highlights --.

Column 9,
Line 47, change "EditTextcell" to -- EditTextCell --.

UNITED STATES PATENT AND TRADEMARK OFFICE
CERTIFICATE OF CORRECTION

PATENT NO. : 7,000,184 B2
DATED : February 14, 2006
INVENTOR(S) : Matveyenko et al.

It is certified that error appears in the above-identified patent and that said Letters Patent is hereby corrected as shown below:

<u>Column 13,</u>
Line 12, change "//System.out.println" to -- //System.out.println --.
Line 63, add a semicolon at the end of the line.

<u>Column 15,</u>
Line 1, change "<SCRIPT>addCellNamez" to -- <SCRIPT>addCellName --.
Line 6, change "}/**" to -- }
                              /** --.

<u>Column 17,</u>
Line 10, change "sm1" to -- sml --.

<u>Column 19,</u>
Line 16, change "wysiwyg" to -- WYSIWYG --.

Signed and Sealed this

Twenty-third Day of May, 2006

JON W. DUDAS
*Director of the United States Patent and Trademark Office*